United States Patent
Tsirkin et al.

(10) Patent No.: US 9,916,173 B2
(45) Date of Patent: Mar. 13, 2018

(54) FACILITATING EXECUTION OF MMIO BASED INSTRUCTIONS

(71) Applicant: Red Hat Israel, Ltd., Raanana (IL)

(72) Inventors: Michael Tsirkin, Yokneam (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 499 days.

(21) Appl. No.: 14/089,105

(22) Filed: Nov. 25, 2013

(65) Prior Publication Data

US 2015/0149997 A1    May 28, 2015

(51) Int. Cl.
G06F 9/455    (2006.01)
G06F 12/06    (2006.01)

(52) U.S. Cl.
CPC ........ *G06F 9/45558* (2013.01); *G06F 12/063* (2013.01); *G06F 9/455* (2013.01); *G06F 9/45533* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 5,812,823 A * | 9/1998 | Kahle ................. | G06F 9/30101 703/26 |
| 5,953,520 A * | 9/1999 | Mallick ............... | G06F 9/45504 703/26 |
| 6,622,263 B1 | 9/2003 | Stiffler et al. | |
| 6,854,071 B2 | 2/2005 | King et al. | |
| 6,886,111 B1 | 4/2005 | Tran | |
| 8,099,730 B2 * | 1/2012 | Wang ................... | G06F 9/5077 718/1 |
| 8,161,243 B1 * | 4/2012 | Wagh ................... | G06F 12/023 711/133 |
| 8,239,610 B2 | 8/2012 | van Riel et al. | |
| 8,392,628 B2 | 3/2013 | Santos et al. | |
| 8,819,676 B2 | 8/2014 | Ports et al. | |
| 8,838,914 B2 | 9/2014 | Adams et al. | |
| 8,954,959 B2 * | 2/2015 | Tsirkin ............... | G06F 12/1009 710/22 |

(Continued)

OTHER PUBLICATIONS

Willmann et al.; "Protection Strategies for Direct Access to Virtualized I/O Devices" USENIX Annual Technical Conference 2008 (Willmann_2008.pdf; pp. 15-28).*

(Continued)

*Primary Examiner* — Hiren Patel
(74) *Attorney, Agent, or Firm* — Lowenstein Sandler LLP (57) ABSTRACT

A hypervisor of a host receives an indication of an exit from a guest to the hypervisor and a memory-mapped input output (MMIO) address that caused the exit to hypervisor. The hypervisor walks a page table of the guest to identify a guest address associated with the MMIO address that caused the exit to the hypervisor. The hypervisor decodes an instruction of the guest referenced by the guest address to determine a type of operation that the guest intended to execute and a location of MMIO information. The hypervisor records, in a page table entry for the MMIO address of a host page table, an association with the type of operation and the location of the MMIO information. The hypervisor executes the operation on behalf of the guest based on the type of the operation and the MMIO information.

20 Claims, 7 Drawing Sheets

(56) References Cited

U.S. PATENT DOCUMENTS

| | | | |
|---|---|---|---|
| 9,122,594 B2* | 9/2015 | Mahalingam | G06F 13/105 |
| 2002/0129226 A1 | 9/2002 | Eisen et al. | |
| 2003/0046505 A1* | 3/2003 | Craddock | G06F 12/12 |
| | | | 711/165 |
| 2003/0093781 A1 | 5/2003 | Krishna et al. | |
| 2003/0212883 A1* | 11/2003 | Lee | G06F 9/5077 |
| | | | 713/1 |
| 2005/0091383 A1 | 4/2005 | Bender et al. | |
| 2005/0204357 A1* | 9/2005 | Garg | G06F 9/4426 |
| | | | 718/1 |
| 2006/0010440 A1* | 1/2006 | Anderson | G06F 9/45533 |
| | | | 718/1 |
| 2006/0259292 A1* | 11/2006 | Solomon | G06F 21/78 |
| | | | 703/27 |
| 2008/0005447 A1* | 1/2008 | Schoenberg | G06F 12/109 |
| | | | 711/6 |
| 2008/0215770 A1* | 9/2008 | Liu | G06F 9/45558 |
| | | | 710/30 |
| 2008/0307180 A1* | 12/2008 | Hattori | G06F 9/45558 |
| | | | 711/163 |
| 2009/0037936 A1* | 2/2009 | Serebrin | G06F 12/0292 |
| | | | 719/318 |
| 2009/0144731 A1* | 6/2009 | Brown | G06F 13/102 |
| | | | 718/1 |
| 2009/0276775 A1* | 11/2009 | Brown | G06F 9/5077 |
| | | | 718/100 |
| 2009/0300263 A1* | 12/2009 | Devine | G06F 12/1009 |
| | | | 711/6 |
| 2010/0037096 A1* | 2/2010 | Bum | G06F 11/1438 |
| | | | 714/19 |
| 2010/0138616 A1* | 6/2010 | Banga | G06F 12/109 |
| | | | 711/154 |
| 2010/0162243 A1* | 6/2010 | Barde | G06F 9/45558 |
| | | | 718/100 |
| 2010/0250824 A1* | 9/2010 | Belay | G06F 9/45558 |
| | | | 711/6 |
| 2011/0153909 A1* | 6/2011 | Dong | G06F 9/45558 |
| | | | 711/6 |
| 2011/0179418 A1* | 7/2011 | Takebe | G06F 9/45558 |
| | | | 718/1 |
| 2011/0296411 A1 | 12/2011 | Tang et al. | |
| 2012/0336763 | 2/2012 | Goel | |
| 2012/0072619 A1* | 3/2012 | Tsirkin | G06F 9/45558 |
| | | | 710/26 |
| 2012/0137292 A1* | 5/2012 | Iwamatsu | G06F 9/45558 |
| | | | 718/1 |
| 2012/0159039 A1 | 6/2012 | Kegel et al. | |
| 2012/0167082 A1* | 6/2012 | Kumar | G06F 9/4555 |
| | | | 718/1 |
| 2014/0068137 A1* | 3/2014 | Kegel | G06F 12/1009 |
| | | | 711/6 |
| 2014/0173338 A1* | 6/2014 | Arroyo | G06F 11/1412 |
| | | | 714/15 |
| 2014/0173628 A1 | 6/2014 | Ramakrishnan | |
| 2014/0379956 A1* | 12/2014 | Chang | G06F 12/1027 |
| | | | 711/6 |
| 2015/0026379 A1* | 1/2015 | Yang | G06F 13/4068 |
| | | | 710/305 |
| 2015/0095548 A1* | 4/2015 | Tsirkin | G06F 9/45545 |
| | | | 711/6 |
| 2015/0127969 A1 | 5/2015 | Arroyo et al. | |
| 2015/0149997 A1 | 5/2015 | Tsirkin et al. | |
| 2015/0199283 A1 | 7/2015 | Epstein | |
| 2016/0062810 A1 | 3/2016 | Von Wendorff | |

OTHER PUBLICATIONS

Tsirkin et al., Re: [Patch RFC] kvm: add PV MMIO EVENTFD, Linux Virtualization, www.spinics.net, Apr. 14, 2013,/C.S.G retrieved on Apr. 22, 2015, 2 pages, Internet: <http://www.spinics.net/lists/linux-virtualization/msg19785.html>.

KVM: MMU: Fast Page Fault, https://lwn.net/Articles/4893071, Mar. 29, 2012, Xiao Guangrong, 3 pages.

[Patch] KVM: MMU: Avoid Fast Page Fault Fixing Mmio Page Fault, https://lkml.org/lkml/2013/7/18/6, Xiao Guangrong, Jul. 18, 2013, 1 page.

USPTO, Office Action for U.S. Appl. No. 14/043,132, dated Mar. 1, 2016.

USPTO, Final Office Action for U.S. Appl. No. 14/043,132, dated Jun. 6, 2016.

USPTO, Office Action for U.S. Appl. No. 14/043,132, dated Dec. 13, 2016.

USPTO, Final Office Action for U.S. Appl. No. 14/043,132, dated Apr. 4, 2017.

USPTO, Advisory Action for U.S. Appl. No. 14/043,132, dated Jun. 20, 2017.

USPTO, Notice of Allowance for U.S. Appl. No. 14/043,132, dated Sep. 20, 2017.

USPTO, Notice of Allowance for U.S. Appl. No. 15/018,043, dated May 3, 2017.

USPTO, Notice of Allowance for U.S. Appl. No. 15/018,043, dated Aug. 10, 2017.

\* cited by examiner

MMIO ACCESS ARRAY 128

| Operation Type (305a) | General Purpose Register 160a |
|---|---|
| Operation Type (305b) | General Purpose Register 160b |
| . . | . . |
| Operation Type (305n) | General Purpose Register 160n |

FACILITATING EXECUTION OF MMIO BASED INSTRUCTIONS

TECHNICAL FIELD

Embodiments of the present disclosure relate to a computer system, and more specifically, to configure a hypervisor of a host to facilitate permitting an assigned device to execute a low-overhead memory-mapped input output (MMIO) instruction by a guest.

BACKGROUND

A central processing unit (CPU) may access a peripheral device, such as a printer or video card using memory mapped input-output (MMIO). MMIO employs the same address bus to address both physical memory and I/O devices (e.g., physical peripheral devices)—the memory and registers of I/O devices are mapped to (associated with) memory address values, respectively. When an address is accessed by the I/O device, the accessed address may refer to a portion of physical RAM or to memory of an I/O device in an address space of the I/O device. CPU instructions employed to access the physical memory may be used for accessing peripheral devices. Each I/O device monitors the address bus of the CPU and responds to any CPU access of an address assigned to the I/O device, connecting the data bus associated with the CPU to the hardware register of the I/O device. To accommodate I/O devices, blocks of addresses used by the host I/O device may be reserved for I/O and are not be available for CPU physical memory.

Virtualization permits multiplexing of an underlying host machine (associated with a physical CPU) between different virtual machines. The host machine or "host" allocates a certain amount of its resources to each of the virtual machines. Each virtual machine may then use the allocated resources to execute applications, including operating systems (referred to as guest operating systems (OS) of a "guest"). The software layer providing the virtualization is commonly referred to as a hypervisor and is also known as a virtual machine monitor (VMM), a kernel-based hypervisor, or a host operating system of the host.

A virtual machine may access a virtual device using guest addresses. The hypervisor may expose a virtual device to the guest to permit the guest to execute instructions on the virtual device. If a virtual device is a virtual peripheral device, such as a virtual printer or virtual video card, the virtual device may be accessed using memory mapped input-output (MMIO).

When a guest address is accessed by the guest, the accessed guest address may refer to a portion of guest RAM or to guest memory of a virtual I/O device. Guest CPU instructions used to access the guest memory may be used for accessing virtual I/O devices. To accommodate virtual I/O devices, blocks of guest addresses used by the virtual devices may be reserved for I/O and are not be available for guest physical memory.

During execution of an MMIO-based instruction of the guest, the guest may attempt to access a guest address mapped to a memory space of the virtual device. The associated CPU typically translates the guest address to a hypervisor address by "walking" through page table entries of a guest page table located in the guest, and then translates the hypervisor address to a physical address using a host page table. In case of MMIO operations, the hypervisor address is an MMIO address mapped to a memory space of the virtual device. In the host page table, entries for MMIO addresses are typically marked as invalid to prevent the guest from directly accessing physical addresses and trigger an exit to the hypervisor. On exit to the hypervisor, the hypervisor is usually provided by the CPU with only the guest address that the guest attempted to access. In order for the hypervisor to identify the associated MMIO instruction(s) and associated parameter(s) (e.g., one or more operands), the hypervisor typically re-executes the page walk and performs relatively computationally expensive instruction retrieval and instruction decoding operations.

DETAILED DESCRIPTION

Methods and systems for permitting a hypervisor to execute a low-overhead MMIO instruction on behalf of a guest are disclosed. A hypervisor of a host machine ("host") receives an indication of an exit from the guest to the hypervisor and a memory-mapped input output (MMIO) address that caused the exit to hypervisor. The hypervisor accesses the guest memory and walks a page table of the guest to identify a guest address associated with the MMIO address that caused the exit to the hypervisor. The hypervisor decodes an instruction of the guest referenced by the guest address to determine a type of operation that the guest intended to execute and a location of MMIO information. The hypervisor records, in a page table entry for the MMIO address in a host page table, an association with the type of operation and the location of the MMIO information. The hypervisor executes the operation on behalf of the guest based on the type of the operation and the MMIO information.

In one example, the hypervisor associates an entry of an array with the type of operation and the location of the MMIO information. The hypervisor stores the association in the page table entry for the MMIO address.

In one example, the hypervisor may add operation-related information, (e.g., the type of operation and the location of the MMIO information) in an entry of an array. When the hypervisor receives an indication of a subsequent exit from the guest to the hypervisor and the MMIO address that caused the exit to the hypervisor, the hypervisor may walk the host page table to locate the page table entry for the MMIO address.

If the hypervisor finds the association in the page table entry for the MMIO address, the hypervisor may obtain the type of operation and the location of the MMIO information from the entry of the array based on the association, and execute the operation on behalf of the guest based on the type of the operation and the MMIO information.

If the hypervisor does not find the association in the page table entry for the MMIO address, the hypervisor walks a page table of the guest to identify a guest address associated with the MMIO address that caused the exit to the hypervisor. The hypervisor decodes an instruction of the guest referenced by the guest address to determine a type of operation that the guest intended to execute and a location of MMIO information. The hypervisor adds an entry for the type of operation and the location of MMIO information to the MMIO array. The hypervisor adds the association to the entry added to the MMIO array to the page table entry for the MMIO address in the host page table. The hypervisor executes the operation on behalf of the guest based on the type of the operation and the MMIO information.

In one example, the hypervisor may add operation-related information (e.g., the type of operation, and the location of the MMIO information) in the page table entry for the MMIO address in the host page table. When the hypervisor receives an indication of a subsequent exit from the guest to the hypervisor and the MMIO address that caused the exit to the hypervisor, the hypervisor may walk the host page table to locate the page table entry for the MMIO address.

If the hypervisor finds the operation-related information in the page table entry for the MMIO address, the hypervisor may retrieve the type of operation and the location of the MMIO information from the page table entry. The hypervisor may execute the operation on behalf of the guest based on the type of operation and the location of the MMIO information.

If the hypervisor does not find the operation-related information in the page table entry for the MMIO address, the hypervisor accesses the guest memory, walks a page table of the guest to identify a guest address associated with the MMIO address that caused the exit to the hypervisor, and decodes an instruction of the guest referenced by the guest address to determine a type of operation that the guest intended to execute and a location of the MMIO information. The hypervisor records in a page table entry for the MMIO address of a host page table, an association with the type of operation and the location of the MMIO information. The hypervisor executes the operation on behalf of the guest based on the type of the operation and the MMIO information.

The location of the MMIO information may be located in a first general purpose register of one or more general purpose registers. The one or more general purpose registers may store additional MMIO information. The additional information may comprise an MMIO address associated with an MMIO-based device or one or more parameters associated with the MMIO operation.

A hypervisor may permit the guest to change a set of addresses that the guest intends to use for MMIO operations. The hypervisor may receive from the guest a set of addresses that the guest intends to use for MMIO operations. The hypervisor may walk the host page table to locate a set of page table entries corresponding to the set of addresses. The hypervisor can mark each entry of the set of page table entries as an invalid page table entry. At a later time, the hypervisor MMIO may receive from the guest an indication that the guest no longer intends to use at least one of the set of addresses for MMIO operations. The hypervisor can mark a corresponding page table entry as valid. In one example, the hypervisor may remove an association with the type of operation and the location of the MMIO information of a page table entry marked as valid.

Accordingly, an efficient method and system is provided that enables a guest to execute an MMIO instruction with low overhead. The method described herein improves processing time by avoiding the overhead associated with computationally expensive instruction retrieval and instruction decoding operations to obtain hypervisor data needed for execution of the MMIO instruction. The hypervisor does not need to access the guest memory to extract information about the intended MMIO instruction and does not need to analyze information in the page table. Additionally, more parameters can be passed to the hypervisor for executing an MMIO instruction on behalf of the guest than would normally be possible when execution passes to the hypervisor from the guest.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
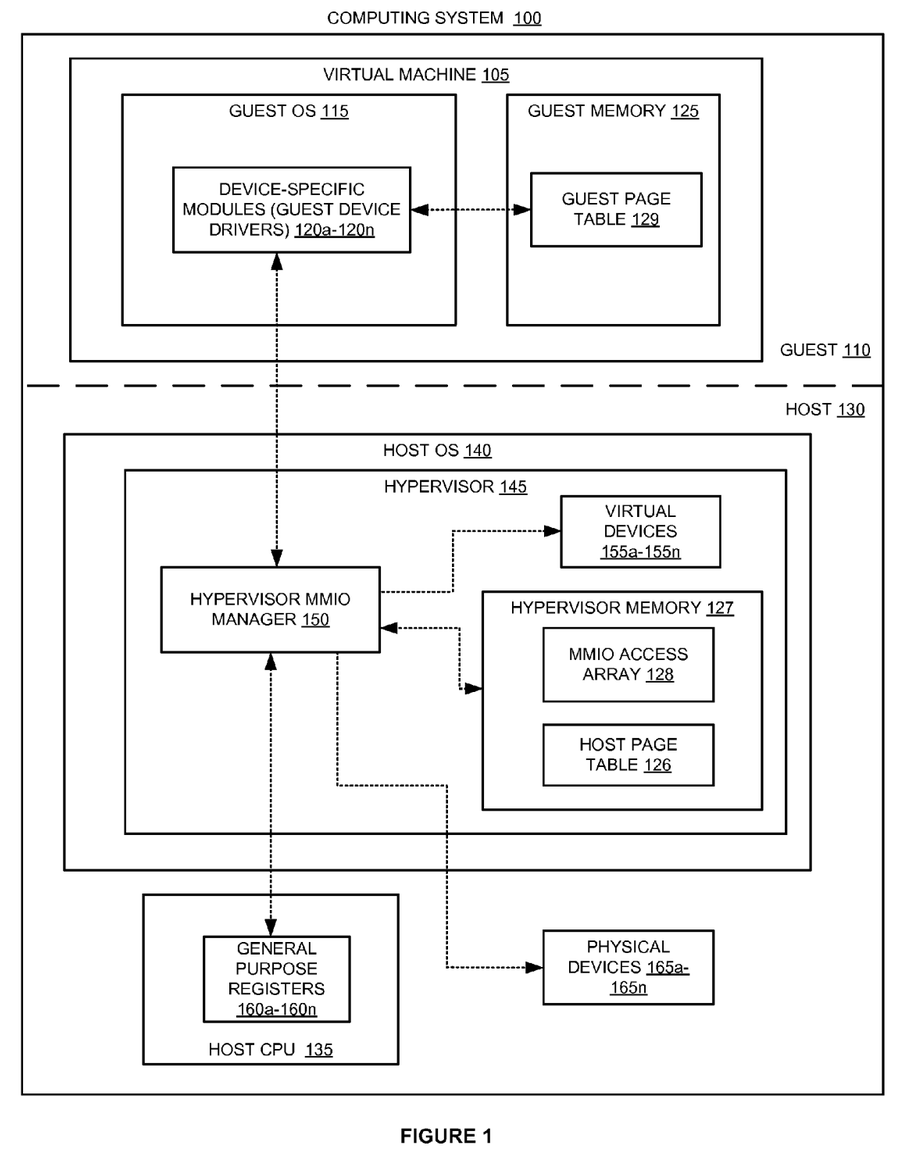
FIG. 1 is a block diagram that illustrates an example computing system in which examples of the present disclosure may operate.

FIG. 1 is a block diagram that illustrates an example computing system 100 in which examples of the present disclosure may operate. The computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest 110, etc.

In one example, the computing system 100 runs a hypervisor 145 to virtualize or expose access to underlying host hardware (e.g., the physical devices 165a-165n) of a host 130, making the use of the virtual machine 105 transparent to the guest 110 and the users of the computing system 100. In one example, the hypervisor 145 may support the virtual machine 105. In one example, the hypervisor 145 is part of a host operating system (OS) 140 of the host 130.

In an example, the computing system 100 also includes hardware components (host hardware) including a host central processing unit (CPU) 135. The computing system 100 may also include host memory (not shown) and physical devices 165a-165n. In a virtualized environment, a virtual machine 105 may not have direct access to the physical devices 165a-165n.

Access to or emulation of a physical device (e.g., 165a) may be indirectly handled by the intervening hypervisor 145. The guest 110 may be configured to load device-specific modules (guest device drivers) 120a-120n associated with one or more virtual devices 155a-155n. The hypervisor 145 is configured to emulate (e.g., provide the guest 115 with access to) the one or more virtual devices 155a-155n in cooperation with the guest device drivers 120a-120n residing on the virtual machine 105.

When the guest 110 attempts to access a virtual device (e.g., 155a) using an MMIO-based instruction, the guest 110 may attempt to access a guest address mapped to a memory space of the virtual device (e.g., 155a). The host CPU 135 translates the guest address to a hypervisor address (MMIO address) by "walking" through page table entries of a guest page table 129 located in the hypervisor memory 127, and then translates the hypervisor address to a physical address using a host page table 126. In the host page table 126, entries for MMIO addresses mapped to a memory space of the virtual device can be marked as invalid to trigger an exit to the hypervisor 145. When the guest 110 attempts to access a virtual device using an MIMO-based instruction, the guest 110 may use a system call designated for MIMO-based instructions, which indicates to the host CPU 135 that an exit from the guest 110 to the hypervisor 145 was the result of the guest's attempt to execute a MMIO-based instruction. On exit to the hypervisor 145, the hypervisor 145 is provided by the host CPU 135 with the MMIO address that has caused an exit from the guest 110 to the hypervisor 145.

In addition to the above MMIO address, the hypervisor 145 should also know the MMIO instruction associated with the MMIO address that caused an exit, and input/output parameter(s) (e.g., one or more operands) of the associated MMIO instruction. To this effect, in one example, one or more of the guest device drivers 120a-120n may be configured to execute a specific MMIO operation of a specific type. For example, one device driver (e.g., 120a) may be configured to transmit packets to an external network (not shown, e.g., the Internet). Another device driver (e.g., 120b, 120n) may be responsible for writing data or reading data, respectively, outside of the virtual machine 105. Each of the guest device drivers 120a-120n may be further configured to "know": (a) what MMIO address(es) to employ for a specific MMIO instruction (e.g., send a packet, store data, etc.), and (b) which general purpose registers GPR(s) 160a-160n may be accessed to determine and to manipulate information stored in the GPR(s) 160a-160n needed to execute a specific MMIO instruction. This information may comprise an indication of a type of operation to be executed, an address to operate on in an MMIO-based device, and other parameters (e.g., one or more operands).

Figure 2:
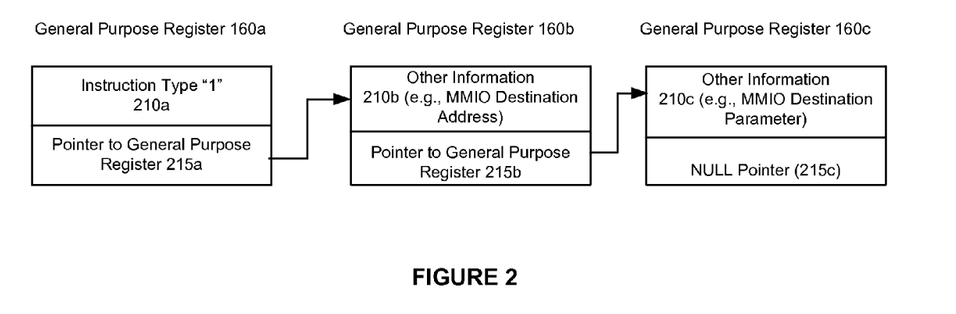
FIG. 2 is a block diagram that illustrates one example of a configuration of general purpose registers.

FIG. 2 is a block diagram that illustrates one example of a configuration of general purpose registers 160a-160n. A general purpose register (e.g., 160a) may be configured to store an indication (e.g., 210a) of a type of MMIO instruction to execute (e.g., instruction type "1"). For example, a code or identifier for transmitting packets may be assigned an instruction type of "1". The general purpose register 160a may be further configured to store an identifier or pointer to additional information (e.g., 215a) needed to execute MMIO instruction type "1". The pointer to additional information (e.g., 215a) may comprises an identifier (e.g., an MMIO address or pointer) to a second general purpose register (e.g., 160b) that may be employed, for example, to provide other information 210b (e.g., the destination address or original address of where the packet to be transmitted is stored). The general purpose register 160b may be further configured to store an identifier or pointer (e.g., 215b) to another general purpose register (e.g., 160c) that stores additional information (e.g., 210c) needed to execute the MMIO instruction type "1". The additional information (e.g., 210c) may comprise, for example, a parameter associated with the MMIO instruction (e.g., a destination parameter). If additional parameters are needed, these may be stored in additional GPRs 160d-160n. If there are no more parameters, then the last pointer field of the last GPR (e.g., field 215c) may be set to a null indicator or pointer.

In the example above, each of the general purpose registers 160a-160n stores a limited amount of information because general purpose registers associated with the host 130 for many CPU architectures are of limited size, hence the need for additional GPRs (e.g., 160b-160n). In an example, the general purpose registers 160a-160n may be known to both the hypervisor 145 and the guest 110.

In an example, the guest 110 may be configured to interact with the guest device drivers 120a-120n to aid the hypervisor 145 to carry out MMIO instructions based on (a) and (b). In one example, the guest 110 may be configured to store (a) and (b) for each of the guest device drivers 120a-120n in corresponding entries of the guest page table 129 located in the guest memory 125, with each entry being associated with a respective MMIO address that a guest device driver (e.g. 120a) intends to operate on to cause an exit to the hypervisor 145, the type of operation that the guest device driver (e.g. 120a) intended to execute, a location of MMIO information (e.g., an address of a first general purpose register (e.g., 160a) needed to carry out the operation, and an indication that the entry is an invalid page table entry).

In an example, the hypervisor 145 may be configured to access respective GPR 160a-160n in order to execute MMIO instructions on behalf of the guest 110. To this effect, the hypervisor 145 may include a hypervisor MMIO manager 150 that assists the hypervisor 145 in determining the above information in an efficient manner. In particular, the hypervisor MMIO manager 150 can store an association to an entry of an MMIO access array 128 in an entry of a host page table 126 located in the hypervisor memory 127. The association corresponds to each combination of a type of MMIO operation to be executed and MMIO information (e.g., a first general purpose register (e.g., 160a)) to access in order to carry out the operation. The hypervisor MMIO manager 150 may later access an entry in the MMIO access array 128 based on the association for reading data from or writing data to one or more virtual devices 155a-155n using MMIO-based instructions on behalf of the guest 110.

In another example, instead of storing the association to the operation-related information (e.g., the type of MMIO operation to be executed and MMIO information) in a separate MMIO access array 128, the hypervisor MMIO manager 150 may store this information in an entry of a host page table 126 corresponding to the MMIO operation for later access by the hypervisor MMIO manager 150 for reading data from or writing data to one or more virtual devices 155a-155n using MMIO-based instructions on behalf of the guest 110.

Figure 3:
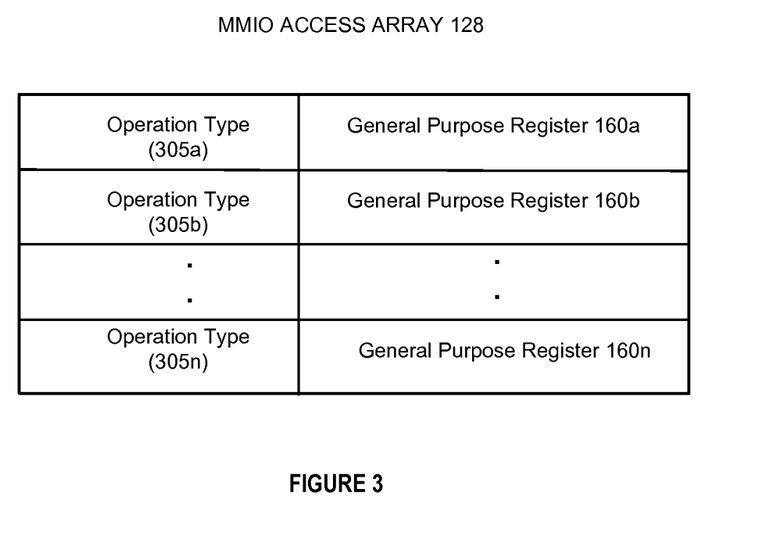
FIG. 3 is a block diagram that illustrates one example of a configuration of an MMIO access array.

FIG. 3 is a block diagram that illustrates one example of a configuration of the MMIO access array 128. The MMIO access array 128 may store types of MMIO operations 305a-305n that the guest 110 intends to execute. The MMIO access array 128 may further store a corresponding set of general purpose registers 160a-160n that the hypervisor MMIO manager 150 may access to reference MMIO-based instructions (e.g., a read instruction or a write instruction) and associated parameters (e.g., an address to read or write a second parameter) as described in FIG. 2.

In one example, before a guest device driver (e.g., 120a) begins execution of an MMIO instruction, the guest device driver (e.g., 120a) may be configured to store an identifier (e.g., "1" for sending a packet) of the MMIO instruction in a general purpose register (e.g., in instruction type field 210a of general purpose register 160a). The guest driver (e.g., 120a) may also store (e.g., in field 215a of general purpose register 160a) an identifier (e.g., a pointer or address) of another general purpose register (e.g., in field 215b of general purpose register 160b) where the guest fast access agent (e.g., 123a) stores additional information about the MMIO instruction (e.g., the address of a packet to be transmitted). The guest driver (e.g. 120a) then attempts to execute the MMIO instruction.

In another example, both the guest driver (e.g., 120a) of the guest 110 and the hypervisor MMIO manager 150 of the hypervisor 145 may include matching logic such that, for example, "if general purpose register 160a stores a '1,' an additional parameter/address may be stored in general purpose register 160b, 160c, etc." In practice, general purpose register 160a may comprise a group of registers, not necessarily one register.

When the guest 110 attempts to execute the MMIO-based instruction by accessing an MMIO-based address, the guest 110 exits to the hypervisor 145. The hypervisor 145 (e.g., the hypervisor MMIO manager 150) receives control from the host CPU 135 and is provided by the host CPU 135 with the address that caused the exit to the hypervisor 145 and an indication from the host CPU 135 that the provided address that has caused an exit from the guest 110 to the hypervisor 145 was the result of the guest's attempt to execute a MMIO-based instruction. Based on the received indication, the hypervisor 145 (e.g., the hypervisor MMIO manager 150) determines that the exit is associated with the memory-mapped input-output (MMIO) instruction.

When a guest device driver (e.g., 120a) of the guest 110 issues an instruction to perform an MMIO operation on a virtual device (e.g., 155a) that causes an exit to the hypervisor 145 for the first time, the hypervisor 145 receives an indication of an exit from the guest 110 to the hypervisor 145 and the MMIO address that caused the exit to hypervisor 145.

Based on the indication, the hypervisor 145 invokes the hypervisor MMIO manager 150 with the MMIO address passed to the hypervisor MMIO manager 150 as an input parameter. The hypervisor MMIO manager 150 is configured to walk the guest page table 129 in the guest memory 125 to locate an entry that identifies a guest address associated with the MMIO address that caused the exit to the hypervisor 145. If an entry is found in the guest page table 128 to contain the MMIO address, the hypervisor MMIO manager 150 is configured to retrieve the corresponding guest address that the guest 110 intended to use, decode a corresponding instruction of the guest 110 referenced by the guest address to determine a type of operation that the guest 110 intended to execute, and determines a location of MMIO information. In an example, the location of information pertaining to the type of operation may be first an address of a general purpose register (e.g., 160a).

The hypervisor MMIO manager 150 records in a page table entry for the MMIO address of a host page table 126 an association with the type of operation and the location of the MMIO information (e.g., an address of a general purpose register (e.g., 160a)). To this effect, in one example, the hypervisor MMIO manager 150 is configured to add an entry to the MMIO access array 128 that contains the type of operation (e.g., 305a) and the location of MMIO information (e.g., an address of a general purpose register (e.g., 160a)). The hypervisor MMIO manager 150 further adds an association to the entry added to the MMIO access array 128 to a corresponding page table entry for the MMIO address in the host page table 126.

In another example, rather than storing and maintaining the MMIO access array 128 separately from the host page table 126, the hypervisor MMIO manager 150 may store operation-related information (e.g., the type of operation (e.g., 305a), and the location of MMIO information (e.g., an address of a general purpose register (e.g., 160a))) in the page table entry for the MMIO address in the host page table 126.

The hypervisor MMIO manager 150 may be configured to execute the operation on behalf of the guest 110 based on the type of the operation and the MMIO information. To this effect, the hypervisor MMIO manager 150 is further configured to identify one or more memory locations associated with the recorded MMIO information. The one or more memory locations store information associated with the MMIO instruction. This information may include at least the type of MMIO instruction to be executed (e.g., 305a). The MMIO information may also include one or more addresses/parameters associated with the MMIO instruction (e.g., an MMIO destination address, an MMIO destination value, etc.).

The operation-related information (e.g., the type of operation (e.g., 305a) and the location of MMIO information)) in the entry of the MMIO address list 128 or the entry of the host page table 126 may be associated with a first general purpose register (e.g., 160a). The hypervisor MMIO manager 150 then consults first general purpose register (e.g., 160a) to retrieve the identifier (e.g., 210a, e.g. "1") of the MMIO operation to be executed. If the operation to be executed has additional parameters, then the pointer to other information field (e.g., 215a) of a second general purpose register (e.g., 160b) may contain a non-null identifier of the next general purpose register to consult. This process repeats until there is a null identifier in the pointer field (e.g., 215c) of a final general purpose register (e.g., 160c) that was consulted.

The hypervisor MMIO manager 150 may be configured to execute the identified instruction on behalf of the guest 110 using the identified instruction and one or more identified operands.

When a guest device driver (e.g., 120a) of the guest 110 issues an instruction to perform an MMIO operation on a virtual device (e.g., 155a) that causes a subsequent exit to the hypervisor 145, the hypervisor 145 receives an indication of an exit from the guest 110 to the hypervisor 145 and the MMIO address that caused the exit to hypervisor 145. Based on the indication, the hypervisor 145 invokes the hypervisor MMIO manager 150 with the MMIO address passed to the hypervisor MMIO manager 150 as an input parameter. The hypervisor MMIO manager 150 is configured to walk the host page table 126 to locate a page table entry for the MMIO address.

If the hypervisor MMIO manager 150 finds an association to an entry of the MMIO access array 128 in the page table entry for the MMIO address in the host page table 126, the hypervisor MMIO manager 150 does not need to perform an expensive decoding operation necessary to determine a type of operation that the guest 110 intended to execute. Rather, in one example, the hypervisor MMIO manager 150 locates the operation-related information in an entry of the MMIO access array 128 based on the association. The hypervisor MMIO manager 150 obtains the operation-related information (e.g., type of operation (e.g., 305a) and the location of the MMIO information (e.g., the general purpose register 160a)) from the entry of the MMIO access array 128. In another example, when a separate MMIO access array 128 is not employed, the hypervisor MMIO manager 150 obtains the operation-related information (e.g., the type of operation (e.g., 305a) and the location of the MMIO information (e.g., the general purpose register 160a)) from the page table entry in the host page table 126. The hypervisor MMIO manager 150 executes the operation on behalf of the guest 110 based on the type of the operation (e.g., 305a) and the MMIO information (e.g., based on at least the general purpose register 160a).

If the hypervisor MMIO manager 150 does not find the operation-related information or an association to the operation-related information in the page table entry for the MMIO address in the host page table 126, the hypervisor MMIO manager 150 walks the guest page table 129 in the guest memory 125 to identify a guest address associated with the MMIO address that caused the exit to the hypervisor 145. The hypervisor MMIO manager 150 decodes an instruction of the guest referenced by the guest address to determine a type of operation (e.g., 305a) that the guest 110 intended to execute and a location of MMIO information (e.g., the general purpose register 160a). The hypervisor MMIO manager 150 adds an entry for the operation-related information (e.g., the type of operation (e.g., 305a) and the location of MMIO information (e.g., the general purpose register 160a)) to the MMIO array 128 or the corresponding entry of the host page table 126. The hypervisor MMIO manager 150 records an association to the entry added to the MMIO array to the page table entry for the MMIO address in the host page table 126. The hypervisor MMIO manager 150 executes the operation on behalf of the guest 110 based on the type of the operation (e.g., 305a) and the MMIO information (e.g., based on at least the general purpose register 160a).

At hypervisor initialization, the hypervisor MMIO manager 150 may be instantiated. During initialization of the hypervisor MMIO manager 150, the hypervisor MMIO manager 150 may be configured to make its presence known to the guest 110. At hypervisor initialization or at a subsequent time, the hypervisor MMIO manager 150 may be configured to permit the guest 110 to provide or change a set of addresses that the guest 110 intends to use for MMIO operations. The hypervisor MMIO manager 150 may be configured to receive from the guest 110 the set of addresses. The hypervisor MMIO manager 150 may be configured to walk the host page table 126 to locate a set of page table entries corresponding to the set of addresses. The hypervisor MMIO manager 150 may be configured to mark each entry of the set of page table entries as an invalid page table entry.

Subsequently, the hypervisor MMIO manager 150 may be configured to receive from the guest 110 an indication that the guest 110 no longer intends to use at least one of the set of addresses for MMIO operations. The hypervisor MMIO manager 150 may be configured to mark a corresponding page table entry as a valid page table entry.

Figure 4:
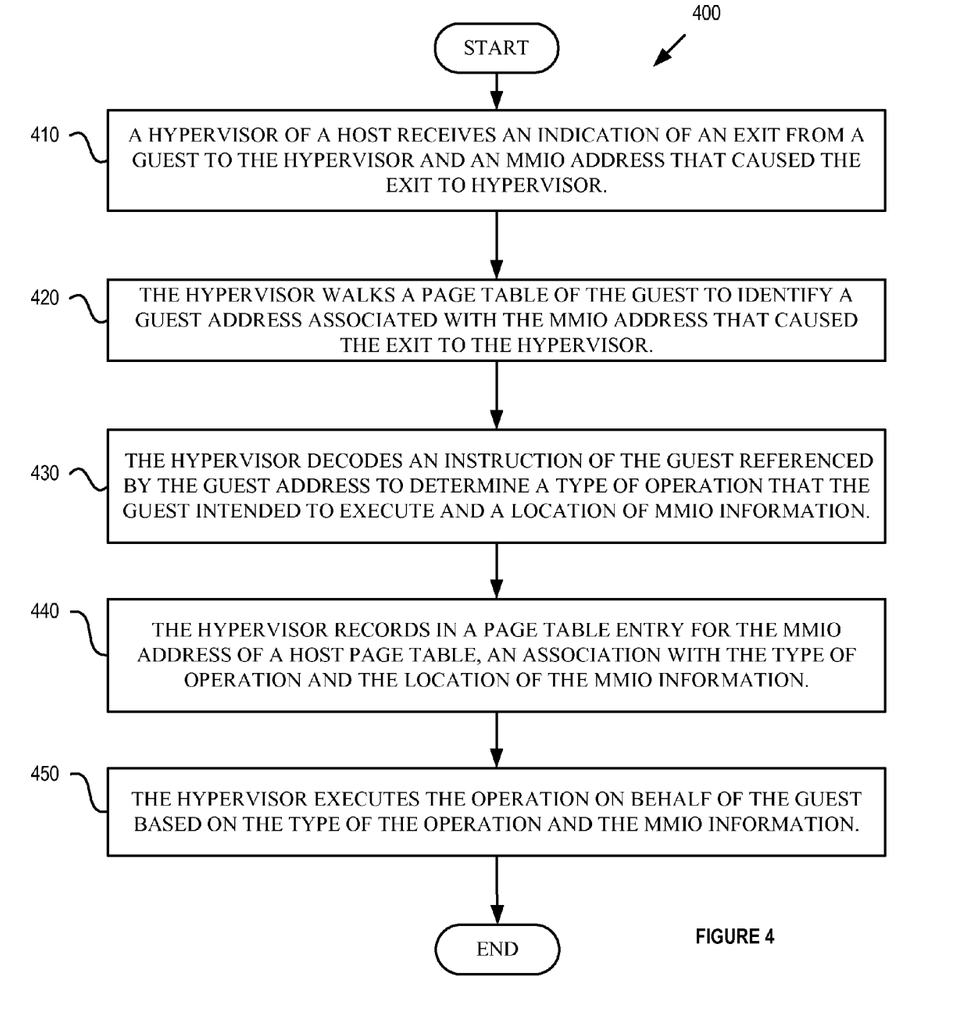
FIG. 4 is a flow diagram illustrating an example of a method for permitting a hypervisor to execute a low-overhead MMIO instruction on behalf of a guest.

FIG. 4 is a flow diagram illustrating an example of a method 400 for permitting the hypervisor 145 to execute a low-overhead MMIO instruction on behalf of a guest 110. The method 400 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 400 is performed by the hypervisor MMIO manager 150 of the hypervisor 145 of the host 130 of FIG. 1.

As shown in FIG. 4, to permit the hypervisor 145 to execute a low overhead MMIO instruction, at block 410, the hypervisor MMIO manager 150 receives an indication of an exit from a guest 110 to the hypervisor 145 and an MMIO address that caused the exit to hypervisor 145. At block 420, the hypervisor MMIO manager 150, upon determining that a host page table entry for the MMIO address does not include an association with an MMIO operation intended by the guest, accesses the guest memory and walks a page table of the guest 110 (e.g., 129) to identify a guest address associated with the MMIO address that caused the exit to the hypervisor 145. At block 430, the hypervisor MMIO manager 150 decodes an instruction of the guest 110 referenced by the guest address to determine a type of MMIO operation (e.g., 305a) that the guest 110 intended to execute and a location of MMIO information (e.g., based on at least the general purpose register 160a). At block 440, the hypervisor MMIO manager 150 records in a page table entry for the MMIO address of a host page table 126, an association with the type of operation (e.g., 305a) and the location of the MMIO information (e.g., based on at least the general purpose register 160a). At block 450, the hypervisor MMIO manager 150 executes the operation on behalf of the guest 110 based on the type of the operation (e.g., 305a) and the MMIO information (e.g., based on at least the general purpose register 160a).

Figure 5:
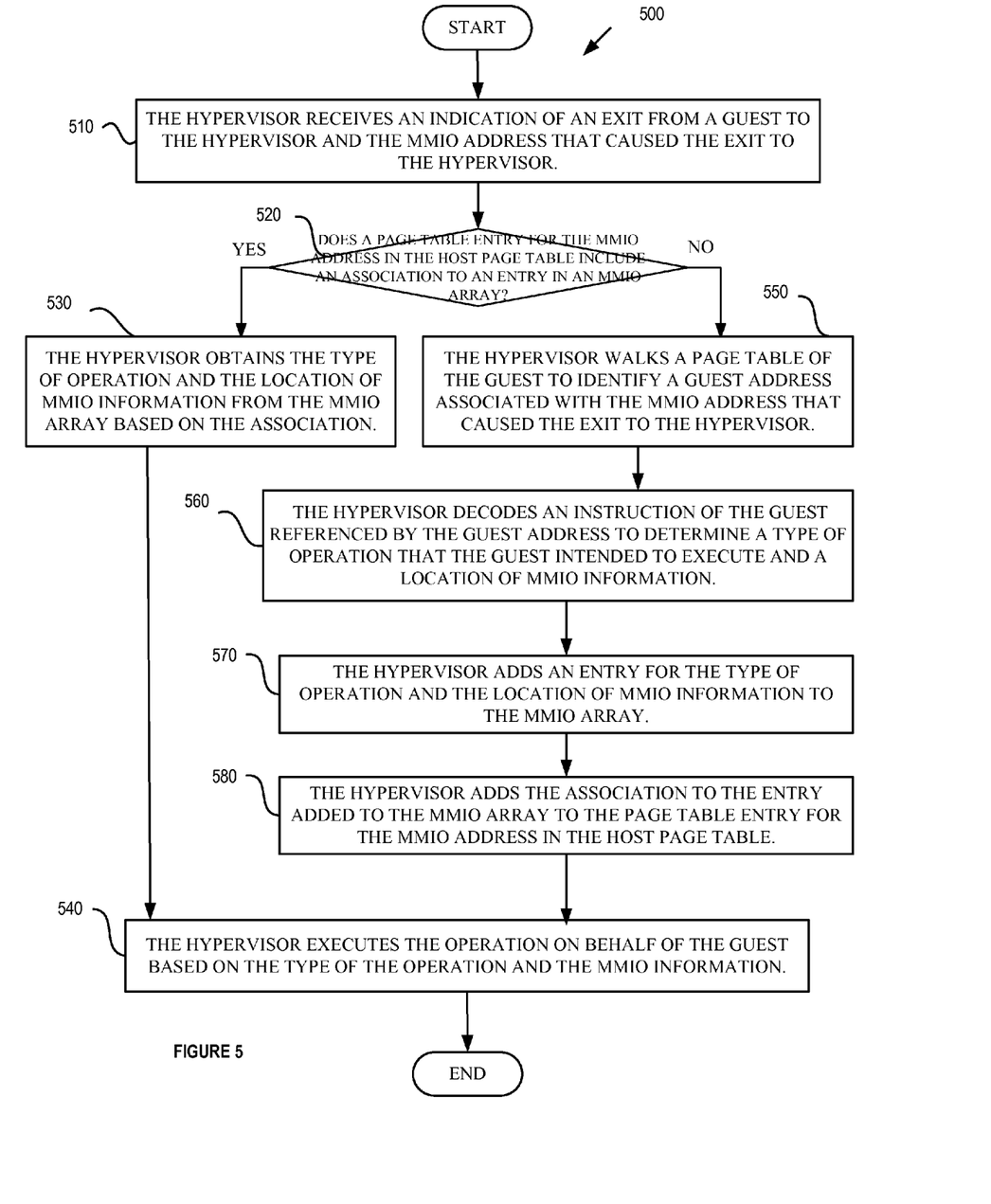
FIG. 5 is a flow diagram illustrating an example of a method for execution of a low-overhead MMIO instruction by the hypervisor on behalf of the guest.

FIG. 5 is a flow diagram illustrating an example of a method 500 for execution of a low-overhead MMIO instruction by the hypervisor 145 on behalf of the guest 110. The method 500 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 500 is performed by the hypervisor MMIO manager 150 of the hypervisor 145 of the host 130 of FIG. 1.

As shown in FIG. 5, at block 510, when the guest 110 accesses a guest address (e.g., 160a) corresponding to an instruction that causes an exit from the guest 110 to the hypervisor 145, the hypervisor MMIO manager 150 receives an indication of a subsequent exit of the guest 110 to the hypervisor 145 from the host 130. The received indication may comprise the guest address that causes an exit from the guest 110 to the hypervisor 145 and an indication that the type of exit to the hypervisor is associated with the execution of an MMIO instruction. At block 520, the hypervisor MMIO manager 150 determines whether a page table entry for MMIO address in the host page table 126 includes an association to an entry in an MMIO access array 128.

If, at block 520, the host page table 126 does include an association to an entry in the MMIO access array 128, then at block 530, the hypervisor MMIO manager 150 obtains the operation-related information (e.g., the type of operation (e.g., 305a) and the location of MMIO information (e.g., the general purpose register 160a)) from the MMIO access array 128. At block 540, the hypervisor MMIO manager 150 executes the operation on behalf of the guest 110 based on the type of the operation (e.g., 305a) and the MMIO information (e.g., based on at least the general purpose register 160a).

If, at block 520, the host page table 126 does not include an association to an entry in the MMIO access array 128, then at block 550, the hypervisor MMIO manager 150 walks a page table of the guest 110 (e.g., 129) to identify a guest address associated with the MMIO address that caused the exit to the hypervisor 145. At block 560, the hypervisor MMIO manager 150 decodes an instruction of the guest 110 referenced by the guest address to determine a type of operation (e.g., 305a) that the guest 110 intended to execute and a location of MMIO information (e.g., based on at least the general purpose register 160a). At block 570, the hypervisor MMIO manager 150 adds an entry for operation-related information (e.g., the type of operation (e.g., 305a) and the location of MMIO information (e.g., the general purpose register 160a)) to the MMIO array 128 or the corresponding entry of the host page table 126. At block 580, the hypervisor MMIO manager 150 adds the association to the entry added to the MMIO access array 128 to the page table entry for the MMIO address in the host page table 126. At block 540, the hypervisor MMIO manager 150 executes the operation on behalf of the guest 110 based on the type of the operation (e.g., 305a) and the MMIO information (e.g., based on at least the general purpose register 160a).

Figure 6:
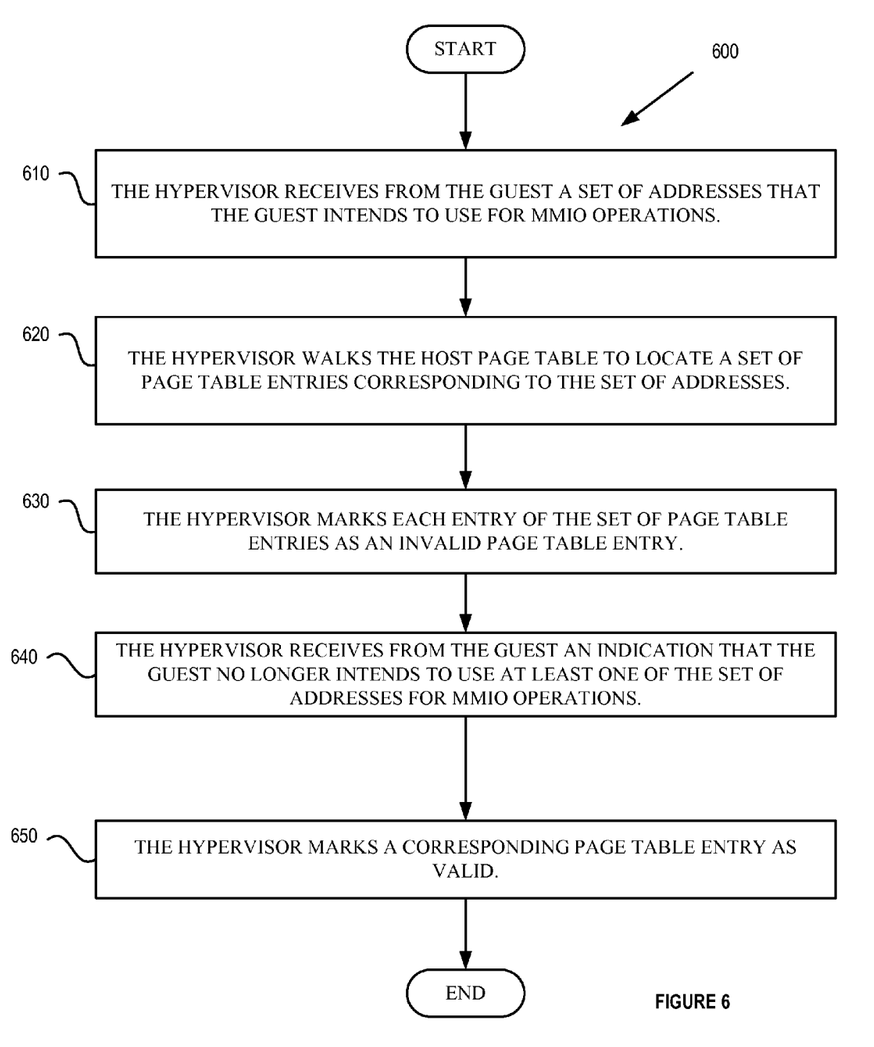
FIG. 6 is a flow diagram illustrating an example of a method for permitting the guest to change a set of address that the guest intends to use for MMIO operations.

FIG. 6 is a flow diagram illustrating an example of a method 600 for permitting the guest 110 to change a set of address that the guest 110 intends to use for MMIO operations. The method 600 may be performed by a computer system 100 of FIG. 1 and may comprise hardware (e.g., circuitry, dedicated logic, programmable logic, microcode, etc.), software (e.g., instructions run on a processing device), or a combination thereof. In one example, the method 600 is performed by the hypervisor MMIO manager 150 of the hypervisor 145 of the host 130 of FIG. 1.

At block 610, the hypervisor MMIO manager 150 receives from the guest 110 a set of addresses that the guest 110 intends to use for MMIO operations. At block 620, the hypervisor MMIO manager 150 walks the host page table 126 to locate a set of page table entries corresponding to the set of addresses. At block 630, the hypervisor MMIO manager 150 marks each entry of the set of page table entries as an invalid page table entry. At a later time, at block 640, the hypervisor MMIO manager 150 receives from the guest 110 an indication that the guest 110 no longer intends to use at least one of the set of addresses for MMIO operations. At block 650, the hypervisor MMIO manager 150 marks a corresponding page table entry as valid. In one example, the hypervisor MMIO manager 150 may remove an association with the type of operation and the location of the MMIO information of a page table entry marked as valid.

Figure 7:
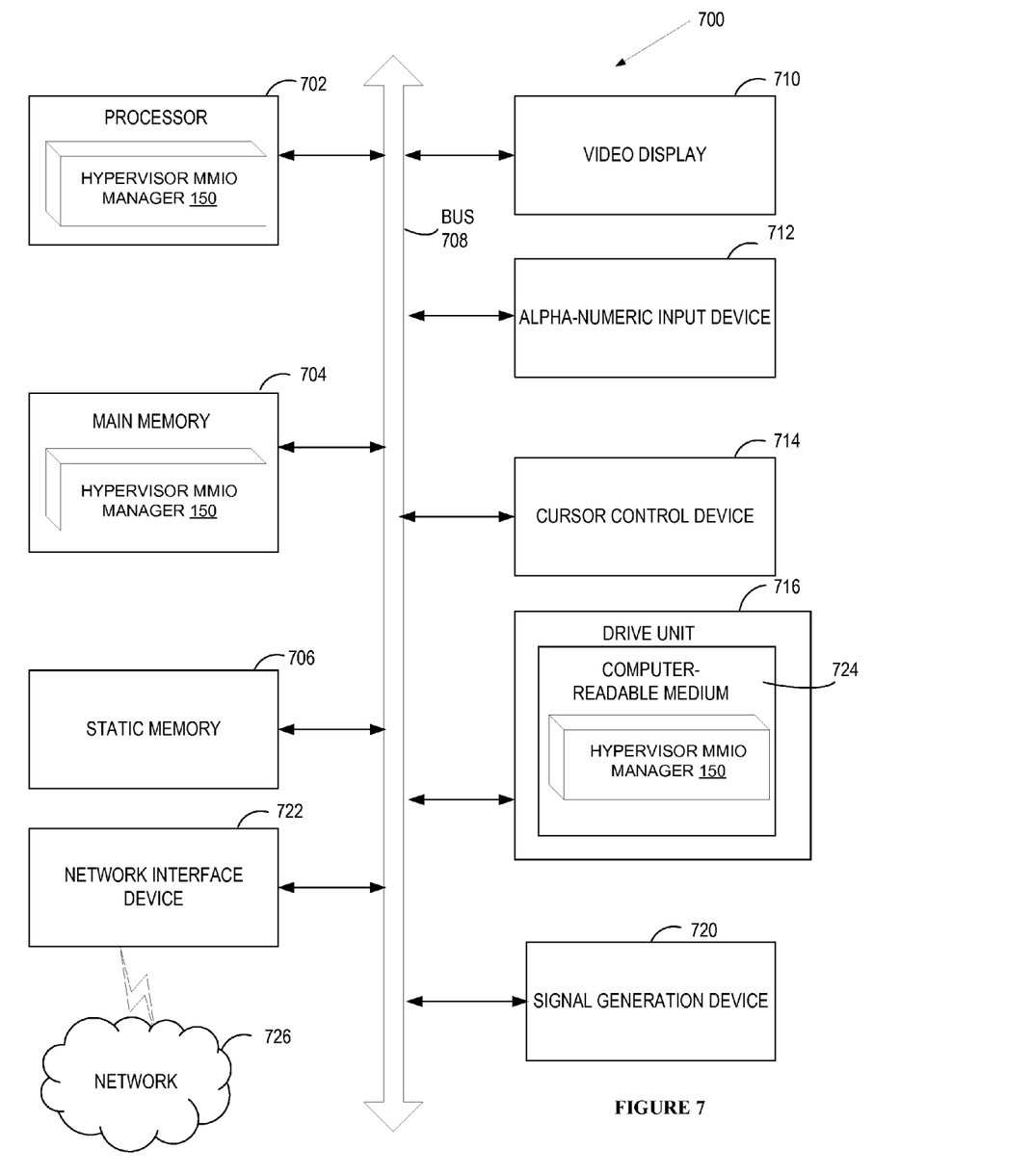
FIG. 7 illustrates a diagrammatic representation of a machine in the example form of a computer system within which a set of instructions, for causing the machine to perform any one or more of the methodologies discussed herein, may be executed.

FIG. 7 illustrates a diagrammatic representation of a machine in the example form of a computer system 700 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The hypervisor MMIO manager 150 shown in FIG. 1 may be executed by processor 702 configured to perform the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

A drive unit 716 may include a computer-readable medium 724 on which is stored one or more sets of instructions (e.g., instructions of the hypervisor MMIO manager 150) embodying any one or more of the methodologies or functions described herein. The instructions of the hypervisor MMIO manager 150 may also reside, completely or at least partially, within the main memory 704 and/or within the processor 702 during execution thereof by the computer system 700, the main memory 704 and the processor 702 also constituting computer-readable media. The instructions of the hypervisor MMIO manager 150 may further be transmitted or received over a network 726 via the network interface device 722.

While the computer-readable storage medium 724 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving, by a host processing device executing a hypervisor, an indication of an initial exit from a guest to the hypervisor and a memory-mapped input output (MMIO) address that caused the initial exit to the hypervisor;
   walking, by the hypervisor, a page table in the guest memory to identify a guest address associated with the MMIO address that caused the initial exit to the hypervisor;
   decoding, by the processing device executing the hypervisor, an instruction of the guest referenced by the guest address to determine a type of operation that the guest intended to execute and a location of MMIO information;
   recording, by the hypervisor in a page table entry for the MMIO address of a host page table in hypervisor memory, an association with the type of operation and the location of the MMIO information; and
   executing, by the hypervisor, the operation on behalf of the guest in view of the type of the operation and the MMIO information.

2. The method of claim 1, wherein recording comprises:
   associating an entry of an array with the type of operation and the location of the MMIO information; and
   storing the association in the page table entry for the MMIO address.

3. The method of claim 2, wherein recording further comprises adding the type of operation and the location of the MMIO information in the entry of the array.

4. The method of claim 3, further comprising:
   receiving, by the hypervisor, an indication of a subsequent exit from the guest to the hypervisor and the MMIO address that caused the initial exit to the hypervisor; and
   walking, by the hypervisor, the host page to locate the page table entry for the MMIO address.

5. The method of claim 4, wherein when the hypervisor finds the association to the page table entry for the MMIO address:
   locating, by the hypervisor, the association in an entry of the array;
   obtaining, by the hypervisor, the type of operation and the location of the MMIO information from the entry of the array; and
   executing, by the hypervisor, the operation on behalf of the guest based on the type of the operation and the MMIO information.

6. The method of claim 4, wherein when the hypervisor does not find the association to the page table entry for the MMIO address:
   walking, by the hypervisor, a page table of the guest to identify a guest address associated with the MMIO address that caused the initial exit to the hypervisor;
   decoding, by the hypervisor, an instruction of the guest referenced by the guest address to determine a type of operation that the guest intended to execute and a location of MMIO information;
   adding, by the hypervisor, an entry for the type of operation and the location of MMIO information to the MMIO array;
   adding, by the hypervisor, the association to the entry added to the MMIO array to the page table entry for the MMIO address in the host page table; and
   executing, by the hypervisor, the operation on behalf of the guest based on the type of the operation and the MMIO information.

7. The method of claim 2, wherein recording further comprises storing the type of operation and the location of the information in the page table entry for the MMIO address.

8. The method of claim 7, further comprising:
   receiving, by the hypervisor, an indication of a subsequent exit from the guest to the hypervisor and the MMIO address that caused the initial exit to the hypervisor; and
   walking, by the hypervisor, the host page table to locate the page table entry for the MMIO address.

9. The method of claim 8, wherein when the hypervisor finds the type of operation and the location of the MMIO information in the page table entry for the MMIO address:
retrieving the type of operation and the location of the MMIO information from the page table entry; and
executing, by the hypervisor, the operation on behalf of the guest based on the type of operation and the location of the MMIO information.

10. The method of claim 8, wherein when the hypervisor does not find the type of operation and the location of the MMIO information in the page table entry for the MMIO address:
decoding, by the hypervisor, an instruction of the guest referenced by the guest address to determine a type of operation that the guest intended to execute and a location of MMIO information;
recording, by the hypervisor in a page table entry for the MMIO address of a host page table, an association with the type of operation and the location of the MMIO information; and
executing, by the hypervisor, the operation on behalf of the guest based on the type of the operation and the MMIO information.

11. The method of claim 1, further comprising:
receiving, by the hypervisor from the guest, a set of addresses that the guest intends to use for MMIO operations;
walking, by the hypervisor, the host page table to locate a set of page table entries corresponding to the set of addresses; and
marking, by the hypervisor, each entry of the set of page table entries as an invalid page table entry.

12. The method of claim 11, further comprising:
receiving, by the hypervisor from the guest, an indication that the guest no longer intends to use at least one of the set of addresses for MMIO operations; and
marking, by the hypervisor, a corresponding page table entry as a valid page table entry.

13. The method of claim 12, further comprising removing, by the hypervisor, the association with the type of operation and the location of the MMIO information of the page table entry.

14. The method of claim 2, wherein the location of the MMIO information is located in a first general purpose register of one or more general purpose registers.

15. The method of claim 14, wherein the one or more general purpose registers store additional MMIO information.

16. The method of claim 15, wherein the additional MMIO information comprises an MMIO address associated with an MMIO-based device or one or more parameters associated with the MMIO operation.

17. A computer system comprising:
a memory;
a host processing device, operatively coupled to the memory, to execute a hypervisor to:
receive an indication of an initial exit by a guest to the hypervisor and a memory-mapped input output (MMIO) address that caused the initial exit to the hypervisor;
walk a page table in the guest memory to identify a guest address associated with the MMIO address that caused the initial exit to the hypervisor;
decode an instruction of the guest referenced by the guest address to determine a type of operation that the guest intended to execute and a location of MMIO information;
record, in a page table entry for the MMIO address of a host page table in the hypervisor memory, an association with the type of operation and the location of MMIO information; and
execute the operation on behalf of the guest in view of the type of the operation and the MMIO information.

18. The system of claim 17, wherein the hypervisor to record further comprises the hypervisor to:
associate an entry of an array with the type of operation and the location of the MMIO information; and
store the association in the page table entry for the MMIO address.

19. A non-transitory computer-readable storage medium including instructions that, when accessed by a host processing device, cause the host processing device to:
receive, by a hypervisor of the host processing device executing the hypervisor, an indication of an initial exit by a guest to the hypervisor and a memory-mapped input output (MMIO) address that caused the initial exit to the hypervisor;
walk, by the hypervisor, a page table in the guest memory to identify a guest address associated with the MMIO address that caused the initial exit to the hypervisor;
decode, by the host processing device executing the hypervisor, an instruction of the guest referenced by the guest address to determine a type of operation that the guest intended to execute and a location of MMIO information;
record, by the hypervisor in a page table entry for the MMIO address of a host page table in hypervisor memory, an association with the type of operation and the location of the MMIO information; and
execute, by the hypervisor, the operation on behalf of the guest in view of the type of the operation and the MMIO information.

20. The non-transitory computer-readable storage medium of claim 19, wherein the hypervisor to record comprises the host processing device to execute the hypervisor to:
associate an entry of an array with the type of operation and the location of the MMIO information; and
store the association in the page table entry for the MMIO address.

* * * * *